(12) United States Patent
Skaaren

(10) Patent No.: US 11,585,313 B2
(45) Date of Patent: Feb. 21, 2023

(54) OFFSHORE POWER SYSTEM THAT UTILIZES PRESSURIZED COMPRESSED AIR

(71) Applicant: Eiric Skaaren, Arlington, TX (US)

(72) Inventor: Eiric Skaaren, Arlington, TX (US)

(*) Notice: Subject to any disclaimer, the term of this patent is extended or adjusted under 35 U.S.C. 154(b) by 0 days.

(21) Appl. No.: 16/152,038

(22) Filed: Oct. 4, 2018

(65) Prior Publication Data

US 2020/0109693 A1 Apr. 9, 2020

(51) Int. Cl.
| | |
|---|---|
| *F03B 13/10* | (2006.01) |
| *H02K 7/18* | (2006.01) |
| *F03B 17/06* | (2006.01) |
| *F03B 3/02* | (2006.01) |

(52) U.S. Cl.
CPC ............. *F03B 13/10* (2013.01); *F03B 3/02* (2013.01); *F03B 17/061* (2013.01); *H02K 7/1823* (2013.01)

(58) Field of Classification Search
CPC .......... F03B 13/10; F03B 3/02; F03B 17/061; H02K 7/1823; F05B 2210/18; F05B 2240/95
USPC ...................................................... 290/52, 54
See application file for complete search history.

(56) References Cited

U.S. PATENT DOCUMENTS

| | | | | | |
|---|---|---|---|---|---|
| 3,443,129 | A * | 5/1969 | Hammitt | ............. | H02K 44/085 310/11 |
| 4,030,303 | A * | 6/1977 | Kraus | ............. | F01K 25/02 60/688 |
| 4,041,710 | A * | 8/1977 | Kraus | ............. | F01K 27/005 60/673 |
| 4,135,364 | A * | 1/1979 | Busick | ............. | F03B 17/005 290/54 |
| 4,363,212 | A * | 12/1982 | Everett | ............. | F03B 17/02 415/5 |
| 4,392,062 | A * | 7/1983 | Bervig | ............. | F03B 17/005 290/1 R |
| 4,407,130 | A * | 10/1983 | Jackson | ............. | F03B 17/02 415/7 |
| 4,430,858 | A * | 2/1984 | Shaw | ............. | F03B 17/02 417/159 |
| 4,767,938 | A * | 8/1988 | Bervig | ............. | F03B 17/005 290/1 R |
| 4,800,727 | A * | 1/1989 | Petrick | ............. | F01K 27/00 310/11 |
| 6,313,545 | B1 * | 11/2001 | Finley | ............. | F03B 13/00 290/54 |
| 7,132,759 | B2 * | 11/2006 | Alstot | ............. | F03G 7/005 290/54 |

(Continued)

FOREIGN PATENT DOCUMENTS

WO WO-2014110160 A2 * 7/2014 ............. F03B 17/02

*Primary Examiner* — Pedro J Cuevas
(74) *Attorney, Agent, or Firm* — Leavitt Eldredge Law Firm

(57) ABSTRACT

A system that produces electricity offshore through a fixed installation, including a minimum of; one turbine, one generator, one compressor set, one high voltage subsea cable, and one control center; the generator is a gas driven generator that produces enough power to operate the electric motors, an onshore control center that operate and monitor the system, and all electricity generated through the water turbines and generators are transported to the onshore electricity grid through a high voltage subsea cable.

1 Claim, 7 Drawing Sheets

(56) References Cited

U.S. PATENT DOCUMENTS

| | | | | |
|---|---|---|---|---|
| 7,239,037 B2* | 7/2007 | Alstot | ............... | F03B 13/00 290/43 |
| 7,329,962 B2* | 2/2008 | Alstot | ............... | F03B 13/00 290/43 |
| 7,584,610 B2* | 9/2009 | Ziegenfuss | ............... | F03B 17/005 60/398 |
| 7,969,029 B2* | 6/2011 | Vitagliano | ............... | F03B 17/04 290/1 R |
| 8,766,469 B2* | 7/2014 | Payre | ............... | F03B 13/06 290/52 |
| 9,194,360 B2* | 11/2015 | Payre | ............... | F03B 13/06 |
| 9,261,068 B2* | 2/2016 | Barakat | ............... | F03B 13/00 |
| 9,677,536 B2* | 6/2017 | Moncada Rodriguez | ............... | F03B 17/005 |
| 10,215,161 B2* | 2/2019 | Viselli | ............... | B63B 35/44 |
| 10,518,849 B2* | 12/2019 | Lim | ............... | F03D 13/25 |
| 2003/0164613 A1* | 9/2003 | Finley | ............... | F03B 13/00 290/54 |
| 2006/0032374 A1* | 2/2006 | Vrana | ............... | B01D 19/0042 95/258 |
| 2007/0284883 A1* | 12/2007 | Cafariello | ............... | F03B 17/00 290/54 |
| 2008/0303282 A1* | 12/2008 | Ziegenfuss | ............... | F03B 17/005 290/52 |
| 2010/0102567 A1* | 4/2010 | Nash | ............... | F03B 17/02 290/54 |
| 2010/0199668 A1* | 8/2010 | Coustou | ............... | F03D 1/04 60/641.8 |
| 2010/0225117 A1* | 9/2010 | DeAngeles | ............... | F03B 17/04 290/54 |
| 2011/0155038 A1* | 6/2011 | Jahnig | ............... | B63B 35/44 114/264 |
| 2012/0201608 A1* | 8/2012 | Belinsky | ............... | E02D 27/42 405/203 |
| 2012/0263537 A1* | 10/2012 | Thornton | ............... | F03B 13/142 405/76 |
| 2012/0274070 A1* | 11/2012 | Payre | ............... | F03B 13/06 290/52 |
| 2012/0297759 A1* | 11/2012 | Chiu | ............... | F15B 3/00 60/398 |
| 2014/0191511 A1* | 7/2014 | Markie | ............... | F03B 17/04 290/54 |
| 2014/0197641 A1* | 7/2014 | Barakat | ............... | F03B 13/00 290/54 |
| 2014/0246860 A1* | 9/2014 | Payre | ............... | F03B 13/06 290/54 |
| 2018/0030961 A1* | 2/2018 | Bodanese | ............... | F03D 13/40 |
| 2018/0030962 A1* | 2/2018 | Bodanese | ............... | F03D 13/10 |
| 2018/0030963 A1* | 2/2018 | Viselli | ............... | B63B 1/107 |
| 2018/0252203 A1* | 9/2018 | Ehrnberg | ............... | F03D 80/00 |
| 2019/0152568 A1* | 5/2019 | Lim | ............... | B63B 43/06 |
| 2019/0368464 A1* | 12/2019 | Knotts | ............... | F03B 17/061 |
| 2021/0222678 A1* | 7/2021 | Ross | ............... | B63B 77/10 |
| 2022/0250723 A1* | 8/2022 | Hutcheson | ............... | B63B 21/50 |

* cited by examiner

OFFSHORE POWER SYSTEM THAT UTILIZES PRESSURIZED COMPRESSED AIR

BACKGROUND

1. Field of the Invention

The present invention relates generally to electricity generating systems, and more specifically, to an offshore power plant that utilizes air pressure below the sea surface to lower density of water and force water to drop through a turbine to create energy to transfer to an onshore electricity grid for use.

2. Description of Related Art

Offshore power systems are well known in the art and are effective means to generate electricity via turbine movement created by waves or the like. For example, conventional offshore power plants utilize a turbine, in which water rotates blades to convert kinetic energy into potential energy via a generator, which can then be utilized by an onshore electrical grid. However, the current systems are expensive to operate and maintain, and pose significant environmental risks to the surrounding water and marine life.

Although great strides have been made in offshore power generating systems, there is always room for improvement. The current system and method is directed to an offshore power generating system in which air is injected into water, forcing the water to rise, wherein the water can then flow through a water pipe and through a turbine based on gravitational force, thereby creating greater output with minimal energy input. By utilizing the pressure below the sea surface, feasibility studies show that it is possible to reduce the pumping costs by 50%, which is significant. Further, studies have shown that this system is much safer for fish and other marine life than the current methods of offshore power generating. The system also eliminates the risk of large, toxic leaks or spills into the ocean that current offshore power generating systems currently pose.

The invention relates to an efficient way to lift seawater to a height, with the sole intention to produce electricity through standard water turbines while eliminating any significant harm to the surrounding environment. The system can also operate during droughts and times of reduced rain due to the system utilizing depth-related water pressure in order to generate power.

To be able to do so, the power plants will utilize pressure 50-1200 meters below the sea surface. By introducing compressed air into submerged pipes, the water has no other option than to move upwards. This water will then again be used to operate the water turbines that generate electricity. The further below sea level that the system is implemented, the more energy will be generated based on the correlating increase in water pressure. This allows the location of the system to be more flexible than traditional offshore power generating systems, and can be used anywhere there is significant water depth pressure.

The electricity produced offshore will be transported to the onshore electricity grid through a high voltage subsea cable and operated from a remote-control center onshore, leaving the offshore power plant un-manned. This eliminates the cost of labor associated with manning conventional offshore power generating systems.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
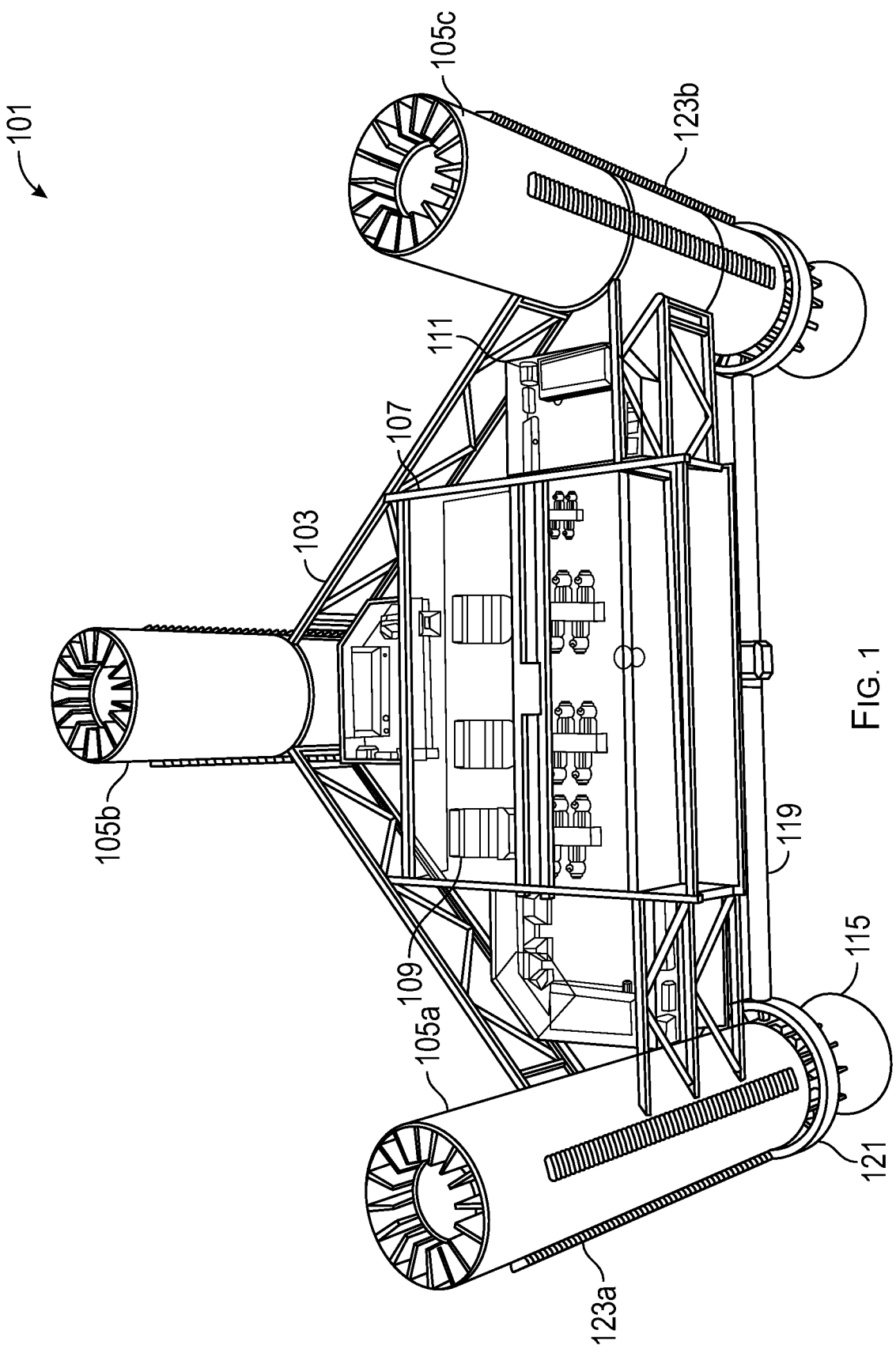
FIG. 1 is an isometric top view of a power generator apparatus in accordance with a preferred embodiment of the present application.
Figure 2:
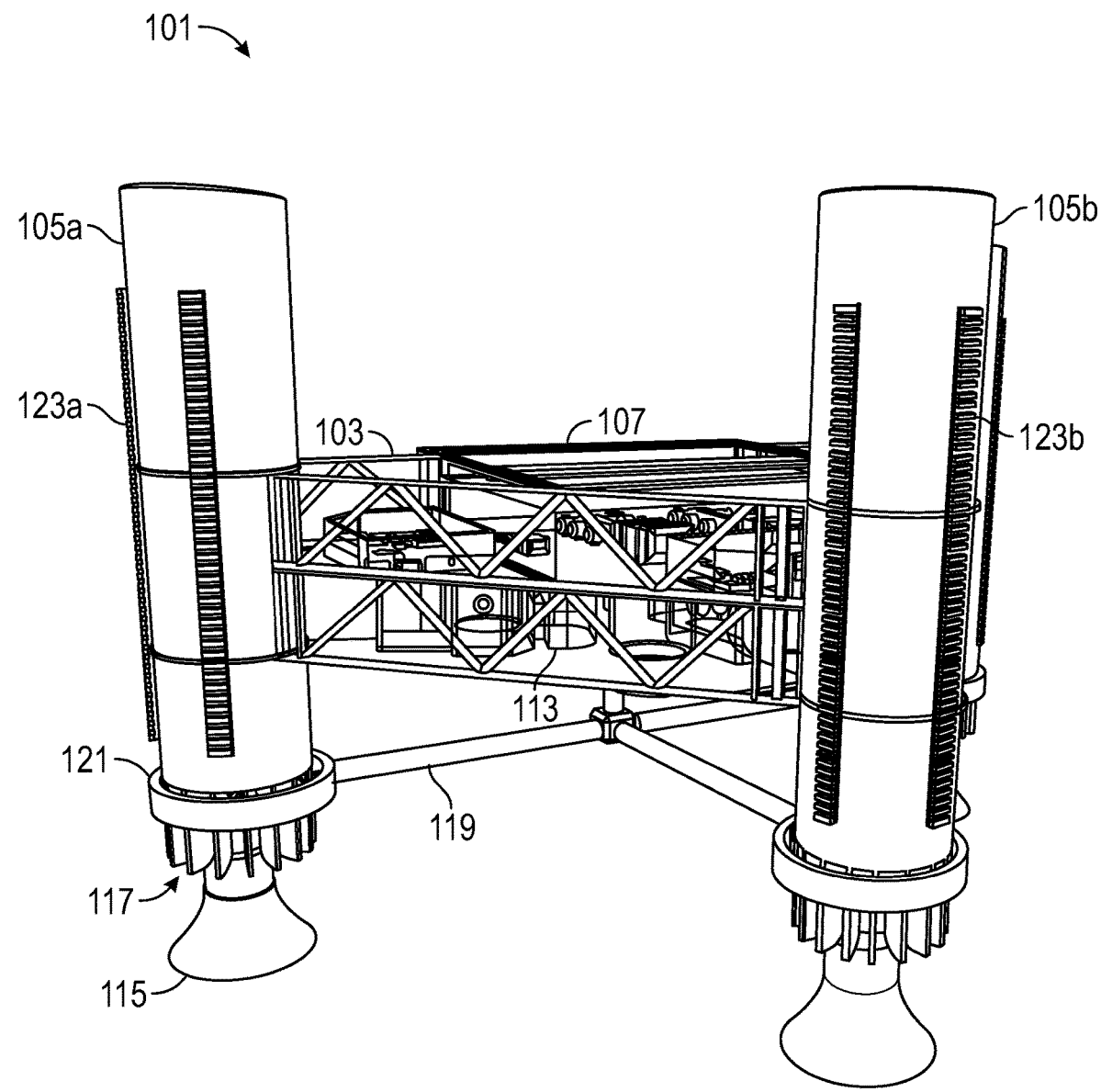
FIG. 2 is an isometric side view of the apparatus of FIG. 1.
Figure 3:
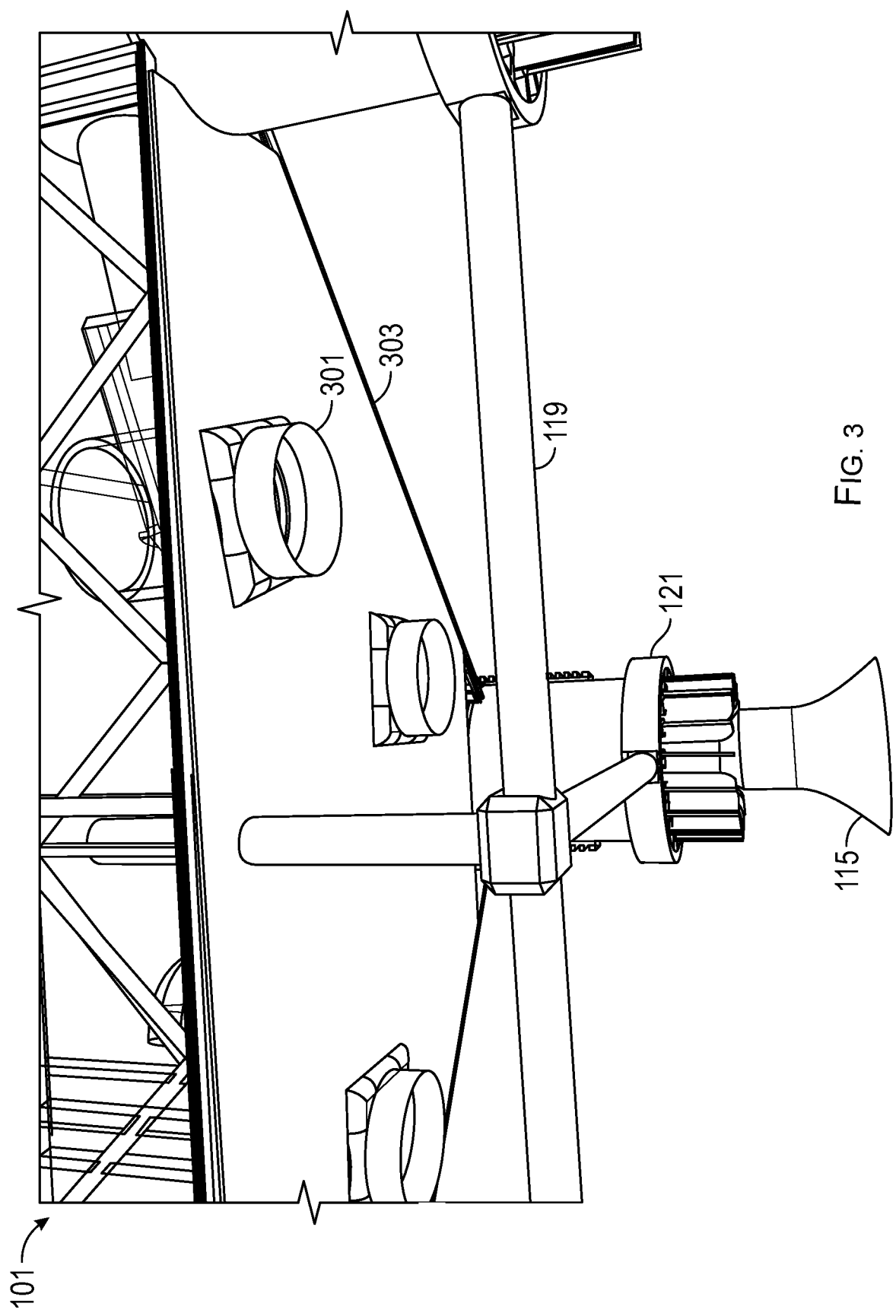
FIG. 3 is an isometric bottom view of the apparatus of FIG. 1.
Figure 4:
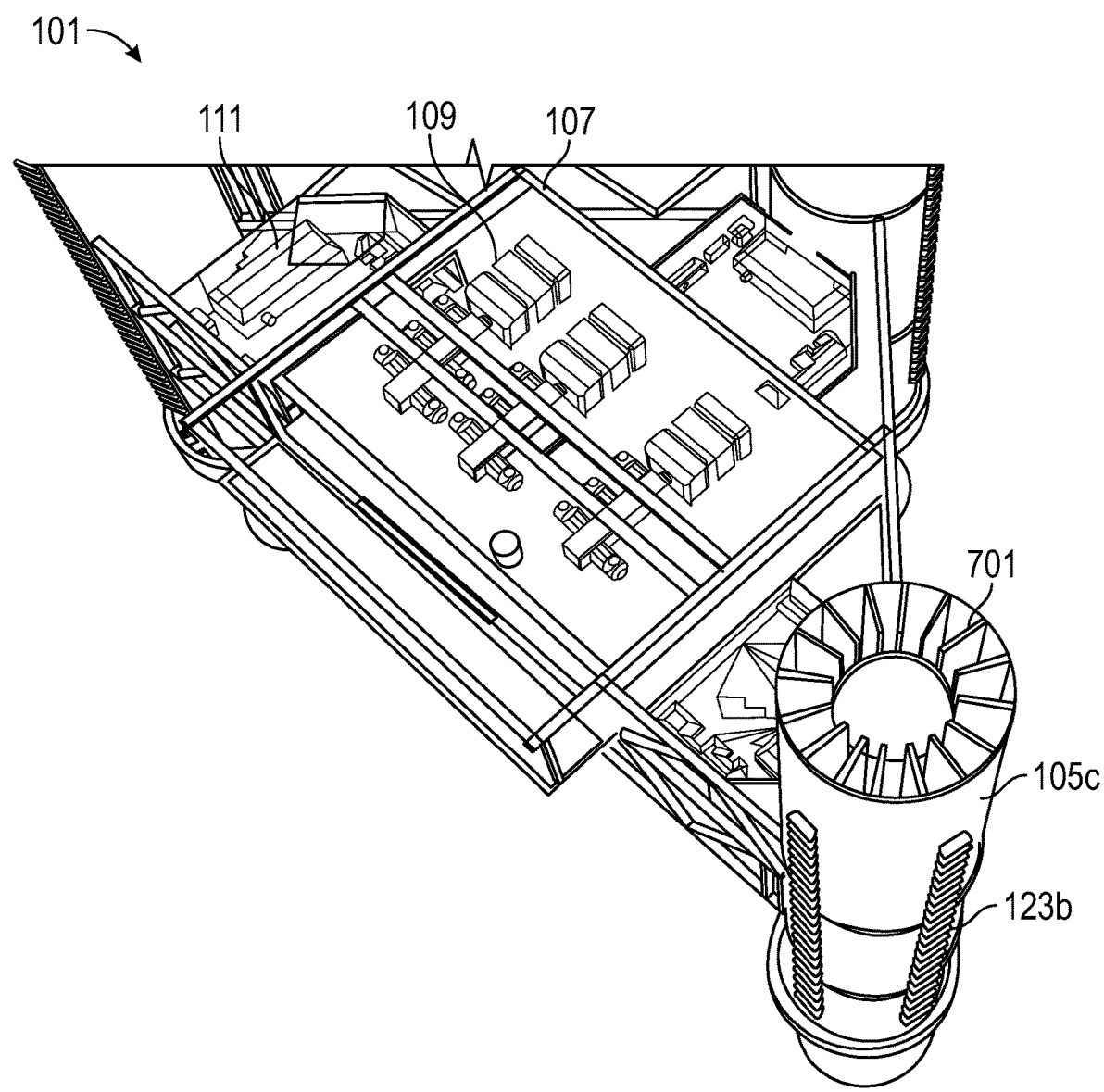
FIG. 4 is a top view of the apparatus of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-4 depict various views of a power generator apparatus 101 for use with an offshore electricity producing system in accordance with a preferred embodiment of the present application. It will be appreciated that system 101 overcomes one or more of the above-listed problems commonly associated with conventional power generator systems.

In the contemplated embodiment, apparatus 101 includes a platform 103 mounted on a plurality of pillars 105a-c. The platform 103 holds a compressor building 107 with one or more compressor sets 109 housed therein. Apparatus 101 further includes one or more compressors 113, where the utility to power the compressors is one or more generators 111. While the preferred embodiment is for the generators 111 to be gas driven, it is contemplated that other types of generators may also be utilized.

Each of the plurality of pillars 105 includes feet 115 to hold the apparatus on the ground surface, with a portion of the apparatus underwater. Further, each pillar further includes water inlet 117. As shown, air piping 119 connects to the one or more compressor sets 109, and extends to each pillar and engages around the water inlet 117 via an air jet manifold 121 (this feature is further shown in FIG. 7). In some embodiments, each pillar includes a gear system 123, which can provide a means for the platform to be positioned at various heights.

Figure 5:
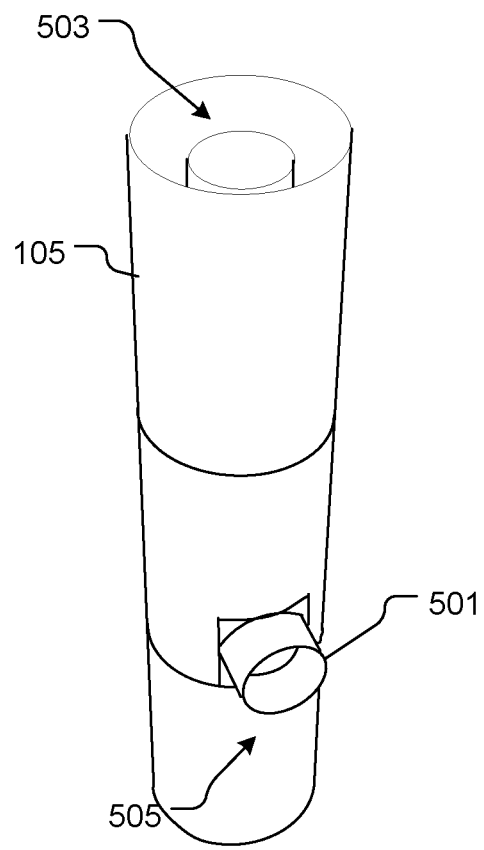
FIG. 5 is an isometric view of a pillar and water output pipe of FIG. 1.
Figure 6:
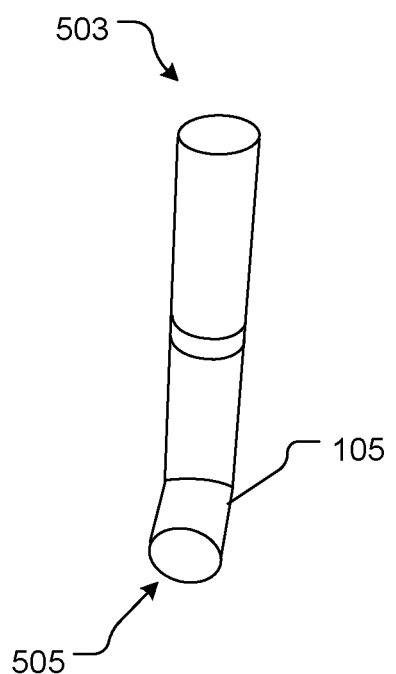
FIG. 6 is an isometric view of the water output pipe of FIG. 5.
Figure 7:
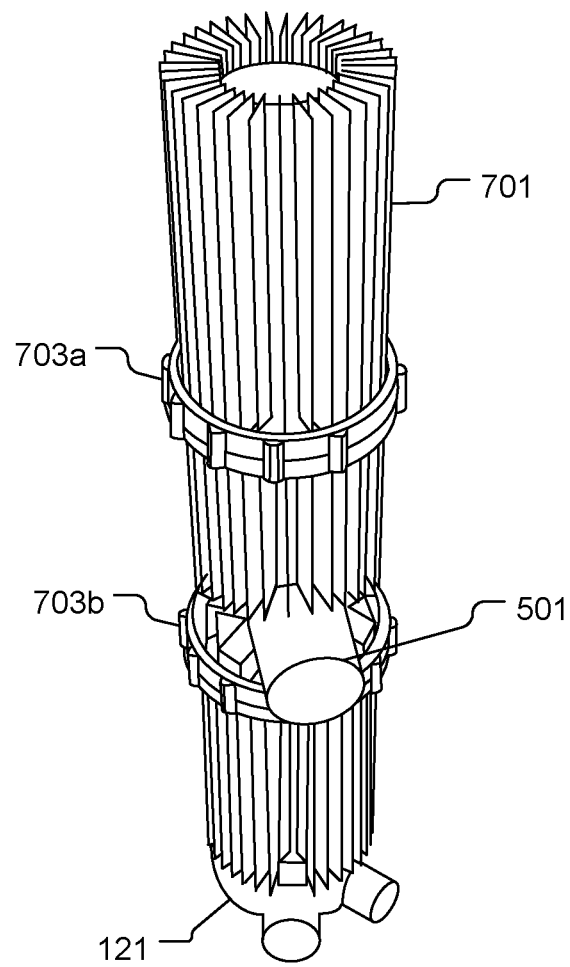
FIG. 7 is an isometric view interior view of a pillar of FIG. 1.

Further, as shown in FIGS. 5 and 6, each pillar 105 houses a water output pipe 501, which extends from a first end 503, to a second end 505. The output pipe 501 is positioned within fins 701 and braces 703a-b, the fins being associated with water inlet, as shown in FIG. 7.

Figure 8:
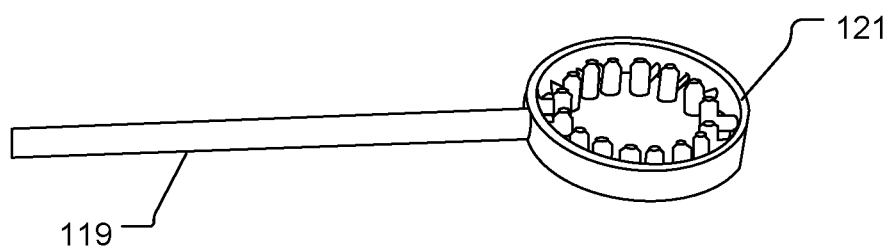
FIG. 8 is an isometric view of an output jet and air flow pipe of FIG. 1.
Figure 9:
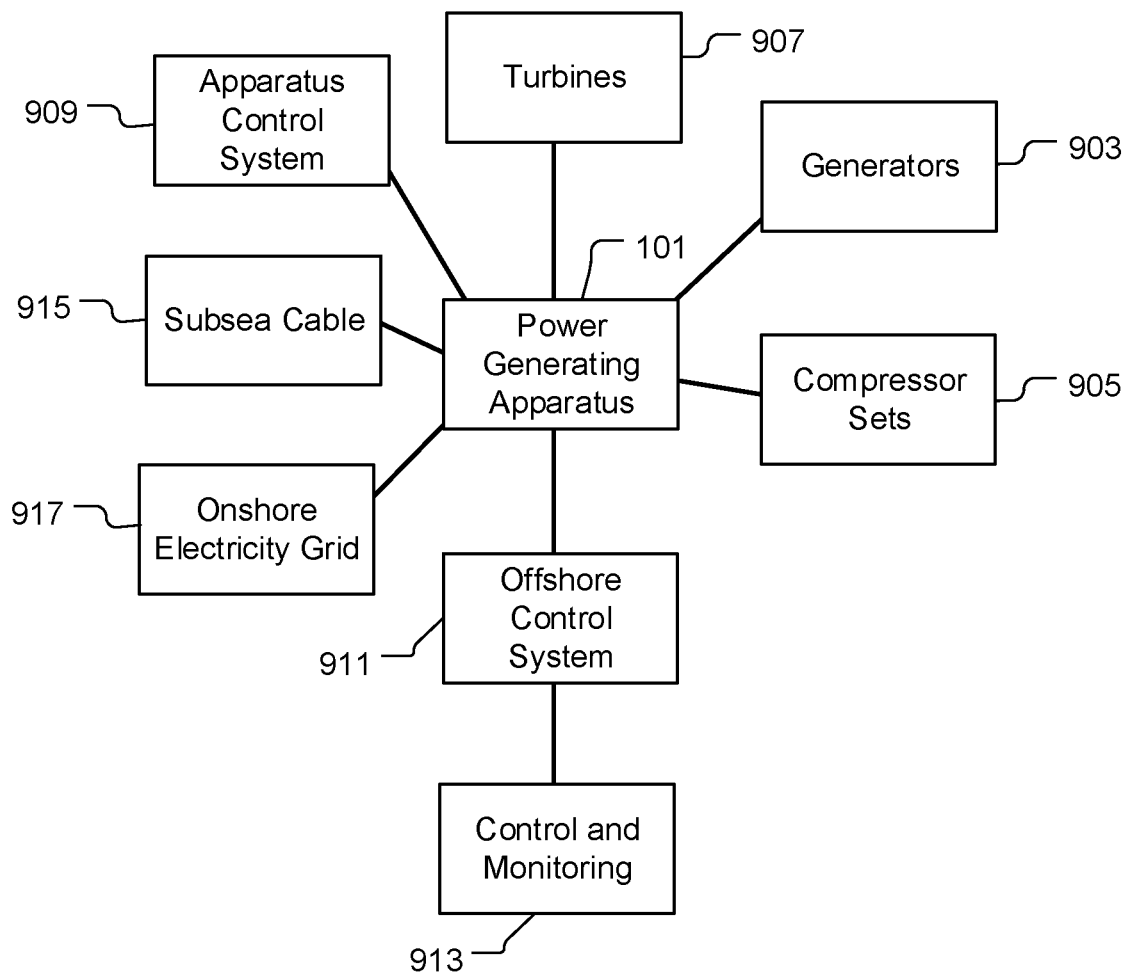
FIG. 9 is a simplified schematic of an offshore power plant system with the apparatus of FIG. 1 in accordance with a preferred embodiment of the present application.

In FIG. 8, an isometric view of an output jet and air flow pipe of FIG. 1 is shown for clarity.

During use, air is injected through piping 119 and into pillars 105, wherein the air mixes with water to lower the density of water. The pillars are positioned wherein a portion of the pillars are underwater, therefore, as the density of water decreases, the water rises above the output pipe 501 in the pillar, and enters from the second end 505, flows through the output pipe and through the first end, and therefore into the one or more turbines 907 to generate electricity via the one or more generators 903.

Apparatus 101 further includes water outlet pipes 301, which in the preferred embodiment are positioned on a base 303 of the platform, wherein the water exits the turbines.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An offshore power system, comprising: a power apparatus, the power apparatus having:
   a platform housing one or more power production turbines;
   one or more compressors;
   one or more pillars configured to rest on an underground ground surface, each of the one or more pillars having:
      one or more water channels extending into the pillar;
      a turbine inlet pipe housed within an interior of the pillar;
      an air pipe system having an output jet positioned around the one or more water channels extending into the pillar; and
      a water output pipe connected to each of the one or more pillars and configured to push water to the one or more turbines; and
   an offshore control system connected to the power apparatus and configured to receive user commands;
   wherein the water output pipe has an end that extends through a thickness of the pillar, and a second end that extends upwards through the pillar, and configured to allow water to enter the second end and flow through the first end towards the one or more turbines; and
   wherein the one or more compressors are configured to inject air into each of the one or more pillars.

* * * * *